United States Patent
Shim et al.

(10) Patent No.: US 10,488,586 B2
(45) Date of Patent: *Nov. 26, 2019

(54) GLASS LIGHT-GUIDE PLATE AND MANUFACTURING METHOD THEREOF

(71) Applicant: LG CHEM, LTD., Seoul (KR)

(72) Inventors: Hyun-Jin Shim, Daejeon (KR); Chang-Hee Lee, Daejeon (KR); Byung-Kook Choi, Daejeon (KR); Jun-Bo Choi, Daejeon (KR); Du-Sun Hwang, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/061,214

(22) PCT Filed: Mar. 20, 2017

(86) PCT No.: PCT/KR2017/002968
§ 371 (c)(1),
(2) Date: Jun. 11, 2018

(87) PCT Pub. No.: WO2017/217642
PCT Pub. Date: Dec. 21, 2017

(65) Prior Publication Data
US 2018/0364415 A1 Dec. 20, 2018

(30) Foreign Application Priority Data
Jun. 13, 2016 (KR) .................. 10-2016-0073332

(51) Int. Cl.
*C03C 4/02* (2006.01)
*F21V 8/00* (2006.01)
(Continued)

(52) U.S. Cl.
CPC ............... *G02B 6/12* (2013.01); *C03C 3/091* (2013.01); *C03C 4/02* (2013.01); *G02B 6/0011* (2013.01);
(Continued)

(58) Field of Classification Search
CPC ...... G02B 6/12; G02B 6/0055; G02B 6/0065; G02B 6/1336; G02B 6/0011;
(Continued)

(56) References Cited

U.S. PATENT DOCUMENTS

| 5,599,753 A | 2/1997 | Watzke et al. |
| 2007/0020465 A1* | 1/2007 | Thiel ............... B32B 17/10036 428/428 |
| 2008/0281141 A1* | 11/2008 | Pinet ..................... B09B 3/005 588/11 |
| 2014/0029295 A1 | 1/2014 | Hsiao et al. |

(Continued)

FOREIGN PATENT DOCUMENTS

| DE | 102005019958 A1 | 11/2006 |
| EP | 2871408 A1 | 5/2015 |

(Continued)

OTHER PUBLICATIONS

Jebsen-Marwedel, H., "Defects in glass manufacturing", pp. 370-375, Light Industry Press, Feb. 1998.

*Primary Examiner* — Michael P Mooney
(74) *Attorney, Agent, or Firm* — Dentons US LLP

(57) ABSTRACT

A glass light-guide plate having a small color difference and a manufacturing method thereof are provided. The light-guide plate includes glass containing 70 to 85 wt % of $SiO_2$, 5 to 20 wt % of $B_2O_3$, 0 to 5 wt % of $Al_2O_3$, 1 to 7 wt % of $R_2O$ (here, R is at least one of Li, Na, and K), 0 to 0.005 wt % of $Fe_2O_3$, and less than 0.002 wt % of a transition metal oxide for adjusting a color difference.

11 Claims, 7 Drawing Sheets

(51) Int. Cl.
  *G02B 6/12* (2006.01)
  *C03C 3/091* (2006.01)
  *G02F 1/13357* (2006.01)

(52) U.S. Cl.
  CPC ......... *G02B 6/0065* (2013.01); *G02F 1/1336* (2013.01); *B32B 2457/202* (2013.01); *G02B 6/0055* (2013.01); *G02B 2006/12038* (2013.01)

(58) Field of Classification Search
  CPC . G02B 2006/12038; C03C 3/091; C03C 4/02; G02F 1/1336; B32B 2457/202
  USPC .............................. 385/129, 901; 349/62–67
  See application file for complete search history.

(56) References Cited

U.S. PATENT DOCUMENTS

| | | |
|---|---|---|
| 2015/0368146 A1 | 12/2015 | Ellison et al. |
| 2016/0238778 A1* | 8/2016 | Hijiya .................... C03C 3/087 |
| 2017/0052311 A1 | 2/2017 | Lautenschlager et al. |
| 2017/0066681 A1 | 3/2017 | Wada et al. |

FOREIGN PATENT DOCUMENTS

| | | |
|---|---|---|
| EP | 3339263 A1 | 6/2018 |
| JP | 2014-026282 A | 2/2014 |
| JP | 2015-072896 A | 4/2015 |
| KR | 10-2013-0127957 A | 11/2013 |
| WO | 2015/068741 A1 | 5/2015 |
| WO | 2015-186486 A1 | 12/2015 |
| WO | 2016148026 A1 | 9/2016 |

\* cited by examiner

<Related Art>

LIGHT-EMITTING DIRECTION

GLASS LIGHT-GUIDE PLATE AND MANUFACTURING METHOD THEREOF

TECHNICAL FIELD

The present disclosure relates to a glass light-guide plate and a manufacturing method thereof, and more specifically, a glass light-guide plate which reduces a color difference, and a manufacturing method thereof.

This application is a National Stage Entry of International Application No. PCT/KR2017/002968, filed on Mar. 20, 2017, and claims the benefit of and priority to Korean Application No. 10-2016-0073332, filed on Jun. 13, 2016, all of which are hereby incorporated by reference in their entirety for all purposes as if fully set forth herein.

BACKGROUND ART

Generally, liquid crystal displays (LCDs) are primarily used for display devices such as notebook computers, desktop computers, and TVs due to advantages of implementing a lightweight and compact design and low power consumption. However, since an LCD is not a device which spontaneously emits light by itself but a light-receiving device, a backlight unit is required in addition to a liquid crystal screen.

FIG. 1 is a schematic cross-sectional view of an LCD according to a related art.

Referring to FIG. 1, the LCD 1 according to the related art includes a liquid crystal panel 10, a backlight unit 20, a cover bottom 30, a guide panel 40, and a top case 50.

The liquid crystal panel 10 includes a thin film transistor substrate 12 and a color filter substrate 14 bonded to each other with a liquid crystal layer interposed between. Also, polarizing members 16 and 18 may be respectively attached to a lower surface and an upper surface of the liquid crystal panel 10. Also, the backlight unit 20 includes a reflection sheet 21, a light source 23 configured to provide light to the liquid crystal panel 10, a light-guide plate 25, a plurality of optical sheets 27, and a housing 29 configured to support the light source 23.

The cover bottom 30 includes a receiving space therein to receive the light source 23, the reflection sheet 21, the light-guide plate 25, and the optical sheets 27, and simultaneously supports the guide panel 40. The guide panel 40 is designed to support the liquid crystal panel 10. As illustrated in FIG. 1, the guide panel 40 may include a panel support portion configured to support the liquid crystal panel 10 and sidewalls surrounding the backlight unit 20. The top case 50 covers not only the edges of the upper surface of the liquid crystal panel 10 but also the side surfaces of the guide panel 40 and the cover bottom 30.

Here, the light-guide plate 25 directs light from the light source 23 toward the liquid crystal panel 10. The light-guide plate 25 primarily includes a polymer material such as poly methyl methacrylate (PMMA) or poly carbonate (PC). The light-guide plate 25 is a key component of the backlight unit 20 to produce a plane light source by uniformly distributing, in an upper direction, light from the lateral light source 23 while minimizing a loss of the light.

However, PMMA, etc., which are materials primarily used for the light-guide plate 25 in the related art, have disadvantages that shapes thereof are deformed and harmful volatile organic compound, etc. are generated at high temperature (90° C.). Also, a coefficient of thermal expansion (CTE) is about 50 to 100×10$^{-6}$/K, which is high, and thus there is a limit in reducing a width of a bezel part, which is a non-display area of the liquid crystal panel 10. Furthermore, since PMMA is a polymer material and so has low mechanical strength, the guide panel 40, which is a metal frame, is additionally used to reinforce the low mechanical strength. Also, PMMA requires a thickness of about 3.5 mm in order to provide optical characteristics inside the backlight unit 20, which limits a slim profile of the LCD 1.

Therefore, a light-guide plate having high-temperature stability, that is, which is not deformed even when exposed to a high temperature environment, which does not generate a harmful gas while it is used, which has a low CTE, which has high mechanical strength and thus does not require a metal frame, etc., and which is advantageous in manufacturing a slim profile display device, and a manufacturing technology thereof are required.

Currently, examination of a new product that applies glass as a material of a light-guide plate is in active progress. Generally, compared with a polymer material according to a related art, glass has excellent mechanical physical properties and thermal durability, but has high light absorption due to a characteristic of a material itself and so it is difficult to uniformly transfer light from a backlight unit to an entire area without color change.

Particularly, reduction of a color difference in a glass light-guide plate is an urgent issue. As described with reference to FIG. 1, in the light-guide plate, the light source is located at a lateral side of the light-guide plate and light propagates. In this case, a difference between color of a portion close to the light source and color of a portion away from the light source occurs due to a light-absorption component inside the light-guide plate, which is referred to as a color difference. In the glass light-guide plate, the color difference tends to seriously appear compared with a polymer light-guide plate according to a related art.

DISCLOSURE

Technical Problem

The present disclosure is designed to solve the problems of the related art, and therefore the present disclosure is directed to providing a glass light-guide plate having a reduced color difference.

The present disclosure is also directed to providing a method of manufacturing the glass light-guide plate.

Technical Solution

In one aspect of the present disclosure, there is provided a light-guide plate including glass containing 70 to 85 wt % of $SiO_2$, 5 to 20 wt % of $B_2O_3$, 0 to 5 wt % of $Al_2O_3$, 1 to 7 wt % of $R_2O$ (here, R is at least one of Li, Na, and K), 0 to 0.005 wt % of $Fe_2O_3$, and less than 0.002 wt % of a transition metal oxide for adjusting a color difference A redox ratio of the glass may be 0.3 or more, preferably, 0.5 or more.

The transition metal oxide may be NiO, CoO, CuO, $Cr_2O_3$, $V_2O_5$, or MnO.

Preferably, the transition metal oxide may be CuO and be contained by 5 to 15 ppm.

While light is guided by 500 mm from a light-input portion (i.e., 500 mm-light guide), a color difference may be +0.015 to −0.015, preferably, +0.010 to −0.010.

The light-guide plate may have absorption in visible light of wavelength (380 nm to 780 nm) as a light-guiding distance increases by 500 mm or more.

The glass may further contain 0.1 wt % or less of carbon to adjust the redox ratio. In another example, the glass may further contain 0.001 to 0.05 wt % of sulfur.

Preferably, the glass may contain 75 to 85 wt % of $SiO_2$.

Also, the glass may contain more than 0.1 wt % of $K_2O$.

Also, the glass may further contain 0 to 0.5 wt % of $SO_3$ or Cl as a fining agent.

Preferably, the light-guide plate may have a thickness of 1.4 mm or more and 2 mm or less. Also, the light-guide plate according to the present disclosure does not require use of an optical film for color correction. Also, the glass may include a pattern structure for scattering incident light.

The glass has visible light (380 nm~780 nm) transmittance that is higher than or equal to that of a polymer light-guide plate or is 92% or more on the basis of 2 mm the thickness. Also, the glass may have a refractive index of 1.49 or less, preferably, 1.475 or less, have a coefficient of thermal expansion (CTE) of $10 \times 10^{-6}$/K or less, preferably, $5 \times 10^{-6}$/K or less. The glass may have density of 2.0 g/cm$^3$ or more, preferably, 2.2 g/cm$^3$ or more and 2.5 g/cm$^3$ or less. The glass transition temperature may be 500° C. or more, preferably, 520° C. or more. For convenience of production, preferably, working temperature (temperature at viscosity of $10^4$ dPas) of the glass may be 1,270° C. or less, more preferably, 1,250° C. or less. Since the light-guide plate including the glass is applied in order to give excellent mechanical strength compared with a light-guide plate of a polymer material according to a related art, the glass may have an elastic modulus (Young's modulus) of 60 GPa or more, preferably, 65 GPa or more. The glass may have a Poisson's ratio (a ratio between lateral and longitudinal deformation) of 0.23 or less, preferably, 0.2 or less. The flexural strength of un-strengthened mother glass may be at least 20 MPa or more, and preferably 25 MPa or more strengthening. Glass obtained by chemically strengthening the glass of the above composition may be also included in the light-guide plate.

The present disclosure is extended to a display device including the light-guide plate according to the present disclosure. Preferably, the display device is an LCD.

In another aspect of the present disclosure, there is also provided a method of manufacturing a light-guide plate including: manufacturing a light-guide plate for experiment from a basic glass composition; determining a wavelength of light at which absorption of the light is relatively small as the light propagates through the light-guide plate for experiment; and incorporating a transition metal oxide which selectively absorbs the wavelength into the basic glass composition, manufacturing a glass, and manufacturing the light-guide plate including the glass.

The basic glass composition may include 70 to 85 wt % of $SiO_2$, 5 to 20 wt % of $B_2O_3$, 0 to 5 wt % of $Al_2O_3$, 1 to 7 wt % of $R_2O$ (here, R is at least one of Li, Na, and K), and 0 to 0.005 wt % $Fe_2O_3$.

The transition metal oxide may be NiO, CoO, CuO, $Cr_2O_3$, $V_2O_5$, or MnO, and may be contained by less than 0.002 wt %.

The method may include, after manufacturing a backlight unit including the light-guide plate for experiment and a light source and integrating the backlight unit with a liquid crystal panel, determining the wavelength by allowing light from the light source to propagate.

The light-guide plate according to the present disclosure may be manufactured by incorporating the transition metal oxide into the basic glass composition, and combining and melting a glass raw material; and forming the molten glass raw material by a float method which uses a molten tin float bath.

Also, the method may further include chemically strengthening the glass light-guide plate.

Advantageous Effects

According to the present disclosure, a glass light-guide plate with composition having high-temperature stability, high mechanical properties enough to replace the conventional polymer light-guide plate and metal frame, smaller thickness, and excellent optical properties is fabricated.

Since a glass light-guide plate according to the present disclosure has high strength, a cover, or its alternative, an aluminum composite material (ACM) or GCM back cover conventionally used to maintain the mechanical strength of a LCD module may be deleted.

Alternatively, a film, a polymer, plastic, metal, etc. can be used in place of the conventional ACM and GCM.

Furthermore, because of having a low coefficient of thermal expansion, the glass light-guide plate is less likely to expand in response to external temperature changes, exhibiting little or no deformation, which is advantageous for reduction of bezel width.

Particularly, the present disclosure may reduce a color difference of the glass light-guide plate by including a transition metal oxide for reducing a color difference. Therefore, light of a backlight unit may be uniformly transferred to an entire area without a color change.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
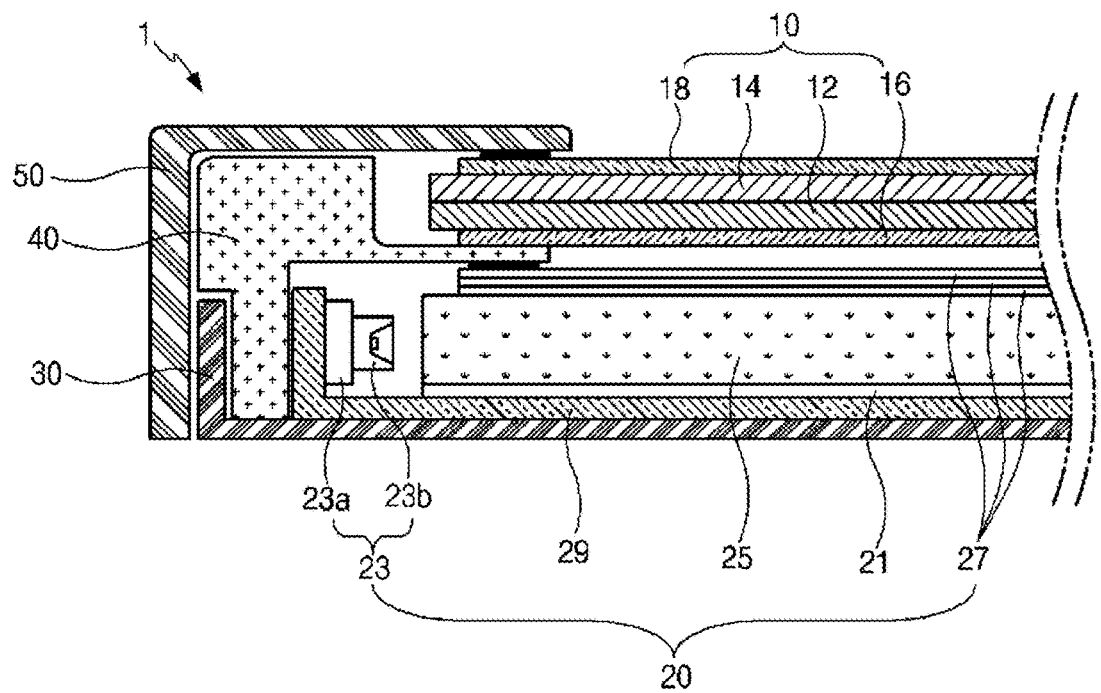
FIG. 1 is a schematic cross-sectional view of an LCD according to the related art.

Hereinafter, preferred embodiments of the present disclosure will be described in detail with reference to the accompanying drawings. However, the present disclosure is not limited to embodiments described below and is implemented in various forms, and the present embodiment is only provided for the purpose of making the present disclosure complete and giving those of ordinary skill in the art complete understanding of the present disclosure. In the drawings, like reference numerals denote like elements.

It should be understood that all the disclosed ranges include the range of starting and ending values and any and all sub-ranges in the range. For example, the range referred to as "1~10" should be construed as including any and all sub-ranges (including the ending value) between the smallest value 1 and the largest value 10, i.e., all ranges (e.g., from 5.5 to 10) starting with the smallest value 1 and ending with the largest value 10.

Figure 2:
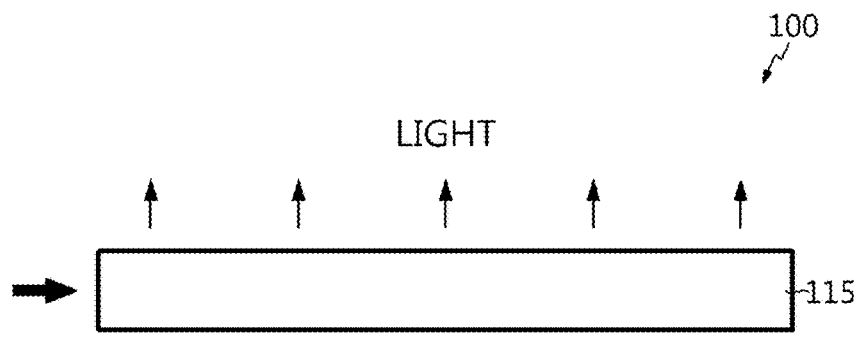
FIG. 2 is a cross-sectional view of a structure of a light-guide plate according to an embodiment of the present disclosure.

Unless otherwise stated, an amount of composition is indicated in "wt %" based on the total weight of final glass composition. A "total amount of iron" in a glass composition disclosed herein is expressed using the term $Fe_2O_3$ according to the standard analysis practice regardless of the phase in which iron really exists. Similarly, an amount of iron in primary phase is reported as FeO even though FeO does not really exist in glass. The term "oxidation/reduction", "redox ratio" or "iron redox ratio" refers to an amount of iron in primary phase (expressed as FeO) divided by a total amount of iron in secondary phase (expressed as $Fe_2O_3$). FIG. 2 is a cross-sectional view of a structure of a light-guide plate according to an embodiment of the present disclosure.

Referring to FIG. 2, a glass light-guide plate 100 according to the present disclosure includes plate-shaped glass 115. Here, though the glass 115 has been described as a plate, for a slim profile of a display device, the glass 115 may be formed in the form of a sheet or a film. A pattern may be formed on at least one surface of the glass light-guide plate 100. For example, a scattering pattern (not shown) may be formed on a lower surface of the glass 115 to emit guided light upwardly.

Particularly, composition of the glass 115 forming the glass light-guide plate 100 includes 70 to 85 wt % of $SiO_2$, 5 to 20 wt % of $B_2O_3$, 0 to 5 wt % of $Al_2O_3$, 1 to 7 wt % of $R_2O$ (here, R is at least one of Li, Na, and K), 0 to 0.005 wt % of $Fe_2O_3$, and a transition metal oxide for adjusting a color difference<0.002 wt %. Also, the composition of the glass 115 may further include 0 to 0.5 wt % of $SO_3$ or Cl as a fining agent.

The glass 115 forming the glass light-guide plate 100 has a redox ratio of 0.3 or more, preferably, 0.5 or more. As understood by those of ordinary skill in the art, the redox ratio is an existence form of an iron component in glass and is defined as an entire iron value in FeO/glass. The redox ratio may be increased by reducing second iron ($Fe^{3+}$) to first iron ($Fe^{2+}$).

When a redox ratio is increased to 0.5 or more in composition of low iron content, reduction in a color difference in an x-direction and a y-direction is observed when the glass 115 is used as a light-guide plate. However, when a redox ratio is increased too much, an iron ion forms impurities such as S and compound FeS in glass under strong reduction atmosphere and so an optical characteristic entirely different from an optical characteristic of ions $Fe^{2+}$ and $Fe^{3+}$ appears. The above-formed compound FeS causes gold-amber coloration to glass and reduces transmittance performance of glass. Therefore, it is preferable to control a redox ratio to 0.5 to 0.8 according to the present disclosure.

Control of a redox ratio may be accomplished by adding a component such as sulfur or carbon as a reducing agent, or controlling raw material melting and refinement conditions and/or an annealing condition.

For example, a redox ratio of glass melt is controlled by adding 0.1 wt % or less of carbon to a glass raw material. Instead, a redox ratio of glass melt may be controlled by adding 0.001 to 0.05 wt % of sulfur component to a glass raw material.

Meanwhile, since $Fe^{2+}$ is generated much at high temperature of a molten glass state, to maintain a redox ratio formed at high temperature, an annealing speed is made fast after forming during glass production such that a redox ratio does not change at high temperature. An annealing speed is 10° C./minute to 40° C./minute. An appropriate annealing speed is determined depending on a width, a thickness, and an amount of drawing of produced glass. When an annealing speed is slower than 10° C./minute, it is difficult to maintain a redox ratio at high temperature. When an annealing speed is faster than 40° C./minute, stress may occur in glass.

The glass 115 forming the glass light-guide plate 100 contains 70 to 85 wt % of $SiO_2$. $SiO_2$ is a network structure-generating body oxide forming the glass 115 and may contribute to increasing chemical durability of glass, allowing the glass to have an appropriate coefficient of thermal expansion (CTE) which may match a neighboring material. However, when the glass 115 includes excessively high content of $SiO_2$, melting or forming of the glass 115 becomes difficult, and viscosity rises and so fining and homogenizing of glass become difficult. Also, the CTE excessively reduces and the glass may easily lose transparency. On the contrary, when the glass 115 includes excessively low content of $SiO_2$, chemical durability may reduce, density may increase, the CTE may increase, and a distortion point may reduce. Therefore, the glass 115 forming the glass light-guide plate 100 contains 70 to 85 wt % of $SiO_2$, preferably, 75 to 85 wt % of $SiO_2$, most preferably, 80 to 85 wt % of $SiO_2$. In this range of $SiO_2$ composition, a chemical durability, a CTE, density, etc. which are appropriate for being manufactured and used as a light-guide plate may be obtained.

Also, the glass 115 may contain 5 to 20 wt % of $B_2O_3$. $B_2O_3$ is a network structure-generating body oxide of the glass 115 and may improve melting reaction of glass, reduce a CTE, improve devitrification resistance, improve chemical durability such as BHF-resistance, and may contribute to reducing density (BHF: buffered hydrofluoric acid for etching SiOx or SiNx, mixed liquid of hydrofluoric acid and ammonium fluoride). However, when the glass 115 contains excessively high content of $B_2O_3$, acid resistance of glass may be reduced, density may increase and a distortion point may be reduced, so heat resistance may deteriorate. Therefore, the glass 115 contains 5 to 20 wt % of $B_2O_3$, preferably, 8 to 15 wt % of $B_2O_3$, most preferably, 8 to 14 wt % of $B_2O_3$. This range of $B_2O_3$ composition may complement melting characteristic reduced by a relatively high content of $SiO_2$ and allows chemical durability, heat resistance, and a CTE which are appropriate for being manufactured and used as a light-guide plate to be obtained.

Also, the glass 115 may contain 0 to 5 wt % of $Al_2O_3$. $Al_2O_3$ may increase high temperature viscosity, chemical stability, thermal shock-resistance, etc. of glass, and contribute to increasing a distortion point, Young's modulus, etc of glass. However, when the glass 115 contains excessively high content of $Al_2O_3$, devitrification resistance, hydrochloric acid-resistance, and BHF-resistance are reduced, and viscosity may be increased. On the contrary, when the glass 115 contains excessively low content of $Al_2O_3$, its addition effect is not fully obtained and Young's modulus may be reduced. Therefore, the glass 115 contains 0 to 5 wt % of $Al_2O_3$, preferably, 1 to 5 wt % of $Al_2O_3$, more preferably, 2 to 3 wt % of $Al_2O_3$. This range of $Al_2O_3$ composition allows desired physical properties in an aspect of mechanical strength such as an elastic modulus, chemical stability, thermal shock-resistance, etc. which are appropriate for being manufactured and used as a light-guide plate to be obtained.

Also, the glass 115 may contain 1 to 7 wt % of $R_2O$ (here, R is at least one of Li, Na, and K). Particularly, $K_2O$ among $R_2O$ may meet a condition of more than 0.1 wt % of $K_2O$.

$R_2O$ is a component which is ion-exchanged in $KNO_2$ solution, etc. during a chemical strengthening process, and may improve melting, forming characteristic, and devitrification resistance of glass, reduce high-temperature viscosity of glass, and contribute to reducing a crack occurrence rate. However, when the glass 115 contains excessively high content of $R_2O$, a CTE of glass excessively increases and so it is difficult for the glass to match a neighboring material, and devitrification resistance and thermal shock-resistance may be reduced. On the contrary, when the glass 115 contains excessively low content of $R_2O$, its addition effect is not fully obtained and an ion-exchange performance may be reduced during a chemical strengthening process. Therefore, the glass 115 contains 3 to 7 wt % of $R_2O$, preferably, 3.5 to 6 wt % of $R_2O$, and most preferably, 3 to 5 wt % of $R_2O$. In this range of $R_2O$ composition, melting characteristic, forming characteristic, thermal shock-resistance, an ion-exchange performance, etc. which are appropriate for being manufactured and used as a light-guide plate may be obtained.

Particularly, $K_2O$ is a component of improving melting characteristic or forming characteristic of glass by reducing high-temperature viscosity of glass, and simultaneously improving devitrification resistance. However, when the glass 115 contains excessively high content of $K_2O$, a CTE may excessively increase. Therefore, $K_2O$ content may be greater than 0.1 wt %. Preferably, $K_2O$ is present in an amount of greater than 0.1 wt % and 1 wt % or less. This range of $K_2O$ composition provides appropriate (not too high) refractive index as a light-guide plate (not to increase reflectivity).

Particularly, the glass 115 of this composition is low iron glass containing 0 to 0.005 wt % of $Fe_2O_3$. Generally, even transparent glass is tinged with light green. This is because a small amount of Fe is included in silica, which is a basic raw material of glass. To obtain more transparent glass than general glass, Fe included in the raw material should be removed. It may be considered that glass from which Fe has been removed has almost no color itself and is transparent. For $Fe_2O_3<0.005$ wt %, an impurity removal process may be required. Though it is most ideal to remove $Fe_2O_3$, since high cost is required to remove $Fe_2O_3$, it is preferable to make $Fe_2O_3$ content less than 0.005 wt %. If possible, it is more preferable to make $Fe_2O_3$ content less than 0.003 wt %. Since $Fe_2O_3$ content is small, glass is not discolored, and the glass light-guide plate 100 including the glass 115 does not require use of an optical film for color correction.

Particularly, the glass 115 of the glass light-guide plate 100 is manufactured from a glass composition controlled to contain a transition metal oxide for color difference control to reduce a color difference, the transition metal oxide being less than 0.002 wt %. The transition metal oxide has a characteristic of absorbing light of particular color depending on a kind thereof. Representative examples of the transition metal oxide include NiO, CoO, CuO, $Cr_2O_3$, $V_2O_5$, or MnO. For example, in soda-lime glass, NiO may absorb a wavelength ranging from 450 nm to 930 nm, CoO may absorb a wavelength ranging from 250 nm to 600 nm, CuO may absorb a wavelength ranging from 450 nm to 780 nm, $Cr_2O_3$ may absorb a wavelength ranging from 450 nm to 650 nm, $V_2O_5$ may absorb a wavelength of 350 nm, and MnO may absorb a wavelength of 430 nm.

The transition metal oxide is known as a colored oxide in the field of glass and it is only known to preferably reduce content of transition metal oxide in order to manufacture transparent glass. However, the present disclosure primarily defines a specific wavelength which requires absorption based on optical characteristics of glass forming a light-guide plate, a light source such as an LED, and an LCD module in the form of an integrated device by using a light absorption characteristic of a transition metal oxide, and minimizes a color difference, which is crucially treated in the glass light-guide plate among optical characteristics, by infinitesimally adding a transition metal oxide which may absorb light of the relevant wavelength. Unlike related art technologies of extremely limiting content of a transition metal oxide to obtain transparent glass or including content of a transition metal oxide to a predetermined amount or more to obtain specific color, the present disclosure provides an unexpected remarkable effect of color difference reduction without color change of glass by finding a wavelength which is less absorbed in a glass light-guide plate, and then adding a transition metal oxide which may absorb that wavelength.

Particularly, in a preferred embodiment, in the case where glass of a light-guide plate is borosilicate glass including $SiO_2$ and $B_2O_3$ as primary components, and a light source is a general white LED, when it is considered that a red wavelength needs to be absorbed, the transition metal oxide is CuO and may be contained by 5 to 15 ppm. Selecting and including the transition metal oxide are described in detail by a method of manufacturing a light-guide plate according to the present disclosure.

As described above, when the glass light-guide plate 100 including the glass 115 having the above composition is used, even though high temperature environment is created by the light source during use, it is possible to make good use of advantages of glass that does not release volatile organic compounds and is less susceptible to deformation induced by external moisture or heat. The light-guide plate 100 proposed by the present disclosure has excellent mechanical strength.

Particularly, the glass light-guide plate 100 includes the glass 115 which may maintain brightness by controlling iron content in glass low and which includes composition controlled by adding a transition metal oxide for reducing a color difference. When the glass light-guide plate 100 is applied to an LCD module, brightness and color difference performance may be met to a level or more of a polymer material according to a related art.

When the transition metal oxide is added, the glass light-guide plate 100 may show a color difference of +0.015 to −0.015, preferably, +0.010 to −0.010 while light is guided by 500 mm from a light-input portion (i.e., 500 mm-light guide). Also, the glass light-guide plate 100 has absorption in a visible light wavelength (380 nm to 780 nm) as a light-guiding distance increases by 500 mm or more.

The glass 115 for the glass light-guide plate 100 should not have defect (bubble, stria, inclusion, pit, scratch, etc.) in an inside and a surface thereof. For this purpose, a method of manufacturing glass includes melting and fining glass by adding a fining agent. The glass 115 may further contain 0 to 0.5 wt % of $SO_3$ or Cl as a fining agent. This content is not an input in a glass raw material and may be an amount remaining in glass molten liquid and also may be an amount remaining in glass after manufacturing. This fining agent and content thereof may improve a fining effect while a glass raw material is dissolved, and suppress generation of a reboil bubble, etc. which may be generated during agitation after fining. Also, since a redox ratio may be changed by inclusion of a fining agent, an amount and a kind of a fining agent are appropriately determined.

Preferably, the glass 115 has a thickness of 2 mm or less in an aspect of a slim profile LCD. The composition of the glass 115 of the glass light-guide plate 100 with a thickness of 2 mm may be adjusted within the above range such that visible light (380 nm-780 nm) transmittance is higher than or equal to that of a polymer light guide plate or is 92% or more, a refractive index thereof is 1.49 or less, and a CTE is $10 \times 10^{-6}$/K or less. Preferably, a refractive index is 1.475 or less, and a CTE is $5 \times 10^{-6}$/K or less. The low CTE allows a size of glass 115 not to remarkably change in response to temperature change. Since deformation does not easily occur even when the glass 115 is exposed to high temperature, the glass 115 may be processed at a high temperature range, thereby expanding the range of applications.

Density of the glass 115 may be 2.0 g/cm³ or more, preferably, 2.2 g/cm³ or more. Also, density of the glass 115 may be 2.5 g/cm³ or more. According to this embodiment, since density of glass is low, a lightweight glass product may be easily accomplished. Particularly, when density of glass is reduced under circumstance in which an apparatus to which glass is applied is large-sized and so an area of glass gradually increases, warping due to weight of glass itself may be reduced and weight of an apparatus to which glass has been applied may be reduced.

A glass transition temperature Tg of the glass 115 may be 500° C. or more, preferably, 520° C. or more. This glass transition temperature is very high compared with a general polymer, which means the glass 115 has excellent heat resistance.

For convenience of production, a working temperature $T_4$ (temperature at viscosity of $10^4$ dPas) of the glass 115 is preferably 1,270° C. or less, more preferably, 1,250° C. or less. According to this embodiment, since $T_4$ related to processing temperature of the glass 115 is low, processing of the glass 115 may become easy, energy and time required for processing the glass 115 may be reduced.

Since the glass light-guide plate 100 is applied to give excellent mechanical strength compared with a light-guide plate of a polymer material according to a related art, an elastic modulus (Young's modulus) of the glass 115 forming the glass light-guide plate 100 may be 60 GPa or more, preferably, 65 GPa or more. According to this embodiment, since an elastic modulus is large, desired mechanical strength may be obtained even with a thin thickness.

Poisson's ratio refers to a ratio of lateral strain $\varepsilon_d$ to longitudinal strain $\varepsilon_l$ under the action of longitudinal stress on a material, and in plain language, a ratio of contraction in the lateral direction to expansion in the longitudinal direction. In simple tensile stress, a perfectly incompressible material deformed elastically at small strain would have a Poisson's ratio of 0.5, a Poisson's ratio of steels is about 0.3, a Poisson's ratio of concrete is 0.1-0.2, and cork has a value close to 0. The glass light-guide plate 100 according to the present disclosure may have a Poisson's ratio (a ratio between lateral and longitudinal deformation) 0.23 or less, preferably, 0.2 or less.

Central tension and compressive stress of glass are related to a Poisson's ratio, a CTE, an elastic modulus, etc. A Poisson's ratio of this range, and a CTE and an elastic modulus of the above-mentioned range are ranges which allow central tension and compressive stress of glass to be in a degree appropriate for being used as a glass light-guide plate.

The flexural strength of the glass 115 as an un-strengthened mother glass may be at least 20 MPa or more, and preferably 25 MPa or more. According to this embodiment, high flexural strength provides resistance to warpage, achieving thickness reduction.

In these Poisson's ratio, CTE, elastic modulus, and flexural strength, the glass 115 maintains mechanical strength as the glass light-guide plate 100 even with a thickness of 2 mm or less. Preferably, if the glass 115 is in a parent glass state which is not strengthening-processed, since a thickness of the glass 115 may be adjusted to a range from 1.6 mm or more and 2 mm or less, the glass 115 is very advantageous in an aspect of a slim profile LCD.

Also, glass obtained by chemically strengthening the glass of this composition may be used for the glass light-guide plate 100. In the strengthened glass, a thickness DOL of a compression stress layer may exceed 10 μm. That is, the compression stress layer of the glass light-guide plate according to the present disclosure may have a thickness exceeding 10 μm when the glass light-guide plate is chemically strengthening-processed. More preferably, a thickness of the compression stress layer may exceed 20 μm. More preferably, a thickness of the compression stress layer may exceed 30 μm. According to this embodiment, since the thickness of the compression stress layer is thick, mechanical strength of the strengthened glass may be improved. Particularly, when the thickness of the compression stress layer is thick, glass may not be destroyed even against damage of some degree of depth.

The above chemically strengthening-processed glass 115 may maintain mechanical strength as the light-guide plate 100 even with a thickness of 1.6 mm or less.

Depending on a thickness and compression strength of the compression stress layer, a thickness of the chemically strengthening-processed glass 115 may be adjusted to a range from 1.4 mm or more to 1.6 mm or less. Therefore, the glass 115 is more advantageous in an aspect of a slim profile of an LCD.

Particularly, since the glass light-guide plate 100 which uses the glass 115 of the above composition is glass including low iron content, the glass light-guide plate 100 does not require use of an optical film for color correction. Conventional glass light guide plate has been proposed, but conventional glass composition has a color coordinate difference and a color difference between a light-input portion on which light from the light source is incident and an anti-light-input portion on the opposite side to light-input portion, resulting low image quality of LCDs. However, according to the present disclosure, this problem is avoided, and there is no need to use an optical film for color correction.

The glass light-guide plate 100 of a backlight unit of an LCD is an element configured to diffuse light incident from a lateral side and irradiate the light in a front direction. Therefore, an optical pattern (not shown) configured to diffuse incident light and irradiate the light in the front direction may be formed on a lower surface of the glass light-guide plate 100. The optical pattern may be formed by texturing or by coating a bead particle layer, etc. The optical pattern has been formed by etching PMMA or coating a polymer layer on a PMMA in a related art, but the optical pattern may be formed by laser etching, or printing a polymer pattern on a glass surface after manufacturing the glass 115.

Figure 3:
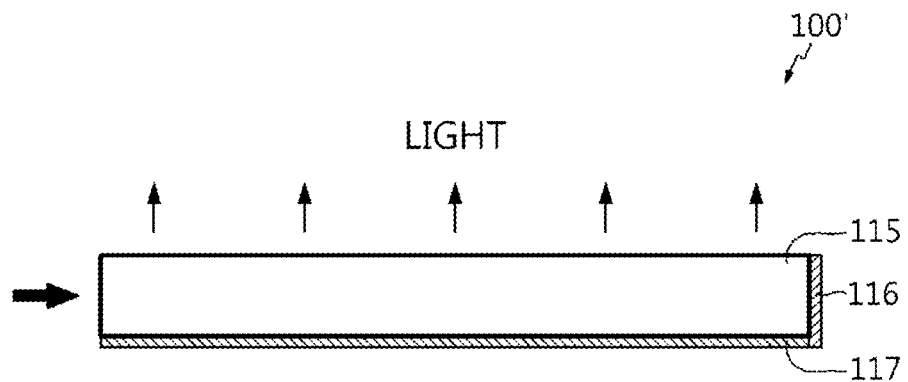
FIG. 3 is a cross-sectional view of a structure of a light-guide plate according to another embodiment of the present disclosure.

FIG. 3 is a cross-sectional view of a structure of a light-guide plate according to another embodiment of the present disclosure.

Referring to FIG. 3, since the light-guiding 100' includes the glass 115 like the previous embodiment, detailed description thereof is not repeated.

Meanwhile, to minimize light loss, the light-guiding plate 100' may further include a reflective layer on other surfaces except a surface (a left surface in the present embodiment) to which light is incident. For example, a lateral reflective layer 116 and a lower reflective layer 117 may be formed by coating combination of $TiO_2$ and a metal layer on a lateral surface and a lower surface of the glass 115. In this case, the metal layer may be formed by coating metal such as Ag, Al, or Cr.

Meanwhile, though not shown, for another example, a surface of the glass 115 to which light is incident may have a structure which is processed to be inwardly concave. When the glass 115 has a structure in which a surface area of a light-incident surface widens, a surface area to which light from a light source is incident widens and so brightness may be advantageously increased.

To form the structure processed to be concave, a method of rolling by using an appropriate structuring device such as pressing or stamping by using an appropriate structuring device may be used. The glass 115 is heated to temperature at which viscosity becomes appropriate for the above purpose, and the temperature is between a softening point of glass and a working point of glass. This kind of structure may be obtained by other manufacturing methods. For example, the structure may be obtained by stamping, etching, machining, chemical etching, or laser ablation. The required structure may be directly obtained from molten glass in the glass manufacturing process by high temperature molding or forming processes.

The glass light-guide plates 100 and 100' may be included in a backlight unit of an LCD.

Figure 4:
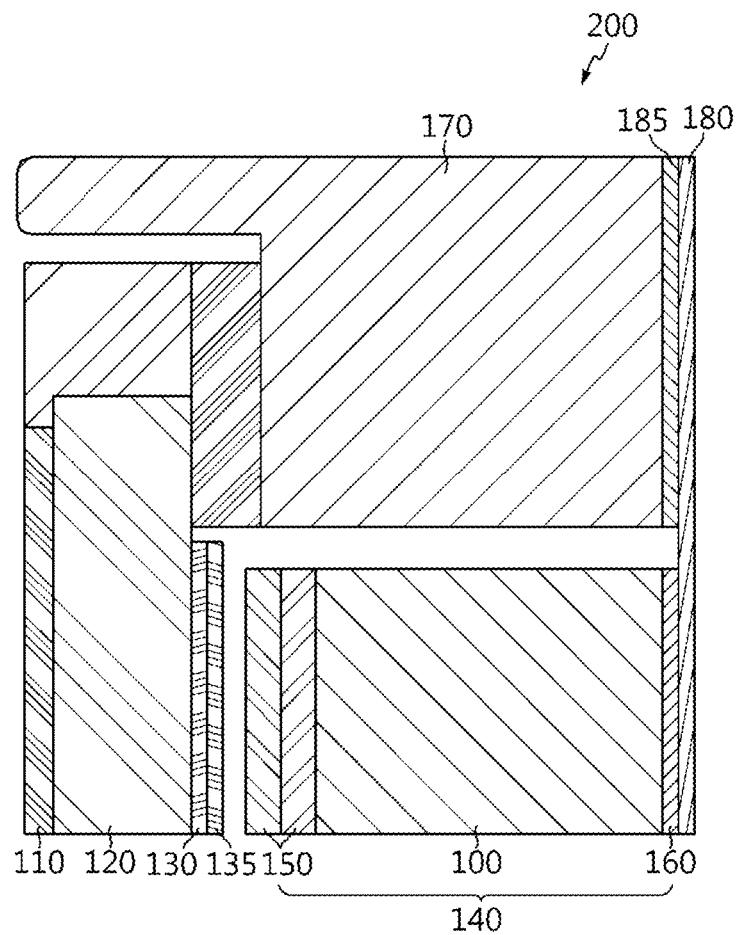
FIG. 4 is a cross-sectional view of an LCD including the light-guide plate of FIG. 2.

FIG. 4 is a cross-sectional view of an LCD including the glass light-guide plate 100 of FIG. 2.

Referring to FIG. 4, the LCD 200 includes a liquid crystal panel 120 including an upper polarization film 110 and a lower polarization film 130. As in an LCD according to a related art, the liquid crystal panel 120 may include a thin film transistor substrate and a color filter substrate which face and are attached to each other with a liquid crystal layer therebetween. Next to the lower polarization film 130, a double brightness enhancement film (DBEF) 135 may be further provided.

A backlight unit 140 is provided with a predetermined interval from the liquid crystal panel 120. The backlight unit 140 may include optical sheets 150, the glass light-guide plate 100 according to the present disclosure, a reflection sheet 160, and a light source (not shown). The liquid crystal panel 120 and the backlight unit 140 are maintained by a middle cabinet 170 configured to laterally surround the liquid crystal panel 120 and the backlight unit 140, and a back cover 180 configured to support a bottom. An adhesive film 185 for preventing moisture penetration through a space may be further provided between the middle cabinet 170 and the back cover 180.

Like an LCD according to a related art, the light source may include at least one LED chip which may emit light, and a package configured to accommodate the LED chip. The light source is arranged on a circuit board 23 (see FIG. 1). The light source may be arranged on an edge portion or a light-incident surface of the glass light-guide plate 100. The light source may be formed on one surface, two surfaces, or all four surfaces of the glass light-guide plate 100 and may be formed on at least one of edge portions of the glass light-guide plate 100 depending on a size of the liquid crystal panel 120, brightness uniformity, etc.

The glass light-guide plate 100 receives light emitted from the light source through a light-incident surface and emits the light through a light-emitting surface. The glass light-guide plate 100 uniformly supplies light provided from the light source to the liquid crystal panel 120.

The optical sheets 150 are arranged on the glass light-guide plate 100, and diffuse and condense light transferred from the glass light-guide plate 100. The optical sheets 150 may include a diffusion sheet, a prism sheet, a protective sheet, etc. The diffusion sheet may disperse light incident from the glass light-guide plate 100 and so prevent light from being partially concentrated. The prism sheet may include triangular prisms arranged on one side thereof. The prism sheet may be arranged on the diffusion sheet and may condense light diffused from the diffusion sheet in a direction perpendicular to the liquid crystal panel 120. The protective sheet may be formed on the prism sheet, may protect a surface of the prism sheet, diffuse light, and so make uniform distribution of light.

The reflection sheet 160 is arranged between the glass light-guide plate 100 and the back cover 180, reflects light such that the light emitted downward from the glass light-guide plate 100 is directed to the liquid crystal panel 120, and so improves efficiency of light.

The reflection sheet 160 may have reflectivity by including, for example, polyethylene terephthalate (PET). One surface of the reflection sheet 160 may be coated with, for example, a diffusion layer including $TiO_2$. Meanwhile, the reflection sheet 160 may include a material including metal, for example, Ag.

Since the glass light-guide plate 100' itself described with reference to FIG. 3 includes the lower reflective layer 117, the reflection sheet 160 may be omitted when the LCD is assembled.

As described with reference to FIG. 1, the LCD 1 according to a related art has used the guide panel 40 and the cover bottom 30 to fix the liquid crystal panel 10. In the case of allowing an LCD module itself to form a TV appearance without additional part of a TV manufacturer in order to manufacture a thinner LCD, like the present embodiment, strength may be maintained by using, instead of the cover bottom 30, an aluminum composite material (ACM) or a GCM of a thickness of 2.0 to 2.5 mm as the back cover 180, and applying the middle cabinet 170 including aluminum configured to surround a periphery.

Particularly, when the glass light-guide plate 100 according to the present disclosure is used, since mechanical strength is excellent compared with a light-guide plate including a PMMA according to a related art, not only a cover bottom according to a related art may be omitted, but also the back cover 180 in the structure of FIG. 4 may be omitted.

A cover bottom-replacing material such as an ACM and a GCM maintains an opaque characteristic which does not transmit light of a light source. Since the glass light-guide plate 100 according to the present disclosure includes the glass 115, the glass light-guide plate 100 is transparent. Also, since the glass 115 has high-temperature stability and a mechanical physical property which may replace a light-guide plate of a polymer material and a metal frame according to a related art, a thin transparent layer such as a film, a polymer, and plastic is applicable instead of omitting the back cover 180 including an ACM or a GCM.

Also, since the thickness of the glass light-guide plate 100 including the glass 115 may be 2 mm or less, a thickness of a bezel part may be made thinner even more. Accordingly, a thickness of an entire LCD module is made small, which is very advantageous in an aspect of a slim profile. Compared with a PMMA thickness of about 3.5 mm according to a related art, a thickness of the glass light-guide plate 100 may be reduced by almost 40%. Also, even when the bezel part is made thin as described above, since a CTE of the glass light-guide plate 100 is as small as a ⅒ level of a PMMA of a related art, deformation does not occur.

The glass light-guide plate 100 according to the present disclosure may be integrated with a light source and other optical materials for the LCD 200 and may form the backlight unit 140, but a separate structure for maintaining strength of the LCD module structure is not required. When needed, a thin transparent layer such as a film, a polymer, and plastic, metal, etc. may be additionally applied.

Preferably, the display device according to the present disclosure is an LCD as described above and includes the glass light-guide plate according to the present disclosure.

Figure 5:
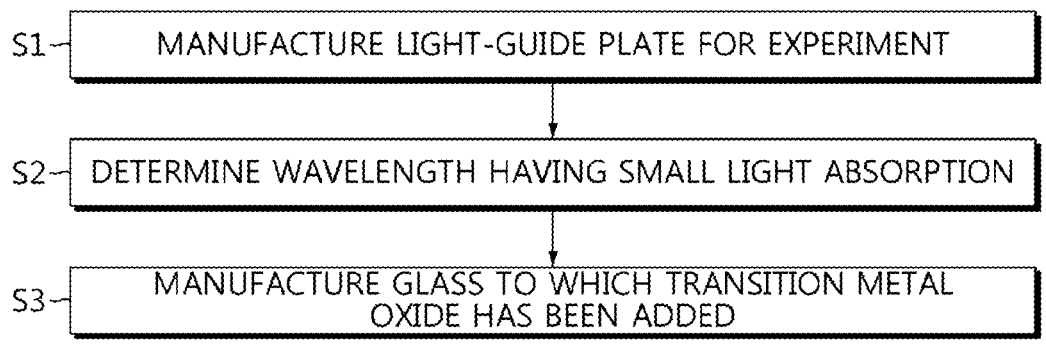
FIG. 5 is a flowchart for explaining a method of manufacturing a glass light-guide plate according to the present disclosure.

FIG. 5 is a flowchart for explaining a method of manufacturing a glass light-guide plate according to the present disclosure.

First, a light-guide plate for experiment is manufactured from a basic glass composition (operation s1).

Next, when light of a light source used for an actual product propagates through the light-guide plate for experiment, a wavelength showing relatively small light absorption is determined (operation s2).

Next, glass is manufactured by additionally incorporating a transition metal oxide which may selectively absorb the determined wavelength into the basic glass composition, and so the glass light-guide plate including the glass is manufactured (operation s3).

The transition metal oxide may be NiO, CoO, CuO, $Cr_2O_3$, $V_2O_5$, or MnO, and the transition metal oxide may be included such that the transition metal oxide<0.002 wt %.

Selection of an added transition metal oxide is not arbitrarily designated and an absorption wavelength is defined depending on an LED light source and a display set, and a component which absorbs a specific wavelength should be selected. In the case where a transition metal oxide is added, each element such as CuO absorbs light of a specific wavelength.

Figure 6:
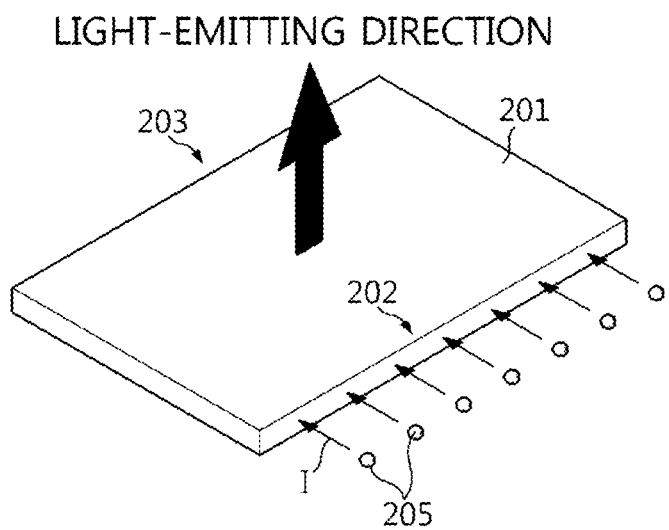
FIG. 6 is a view illustrating a color difference of a light-guide plate.

FIG. 6 is a view illustrating a color difference of a light-guide plate.

Referring to FIG. 6, as described with reference to FIG. 1, a light source 205 is located at a lateral side of a light-guide plate 201. As described above, the light-guide plate 201 should uniformly disperse light upwardly and produce plane light while minimizing loss of light emitted from the lateral light source 205. In this case, a difference generated between color of a portion 202 close to the light source 205 and color of a portion 203 away from the light source 205 is referred to as a difference in color coordinates, that is, a color difference. The color difference occurs in the same direction as a light-incident direction I and a color difference gradient exists in the light-incident direction.

Causes of a color difference may be classified into causes due to a light-guide plate and causes due to an optical mechanism inside a display device. The causes due to the light-guide plate may be classified into light absorption due to glass composition and light absorption due to impurities inside glass. The causes due to the optical mechanism inside the display device is generated by all light absorption factors inside an integrated display device such as a polarization film, a diffusion sheet, a prism sheet, a protective sheet, and an LCD module. The present disclosure may reduce a color difference by all these factors.

Figure 7:
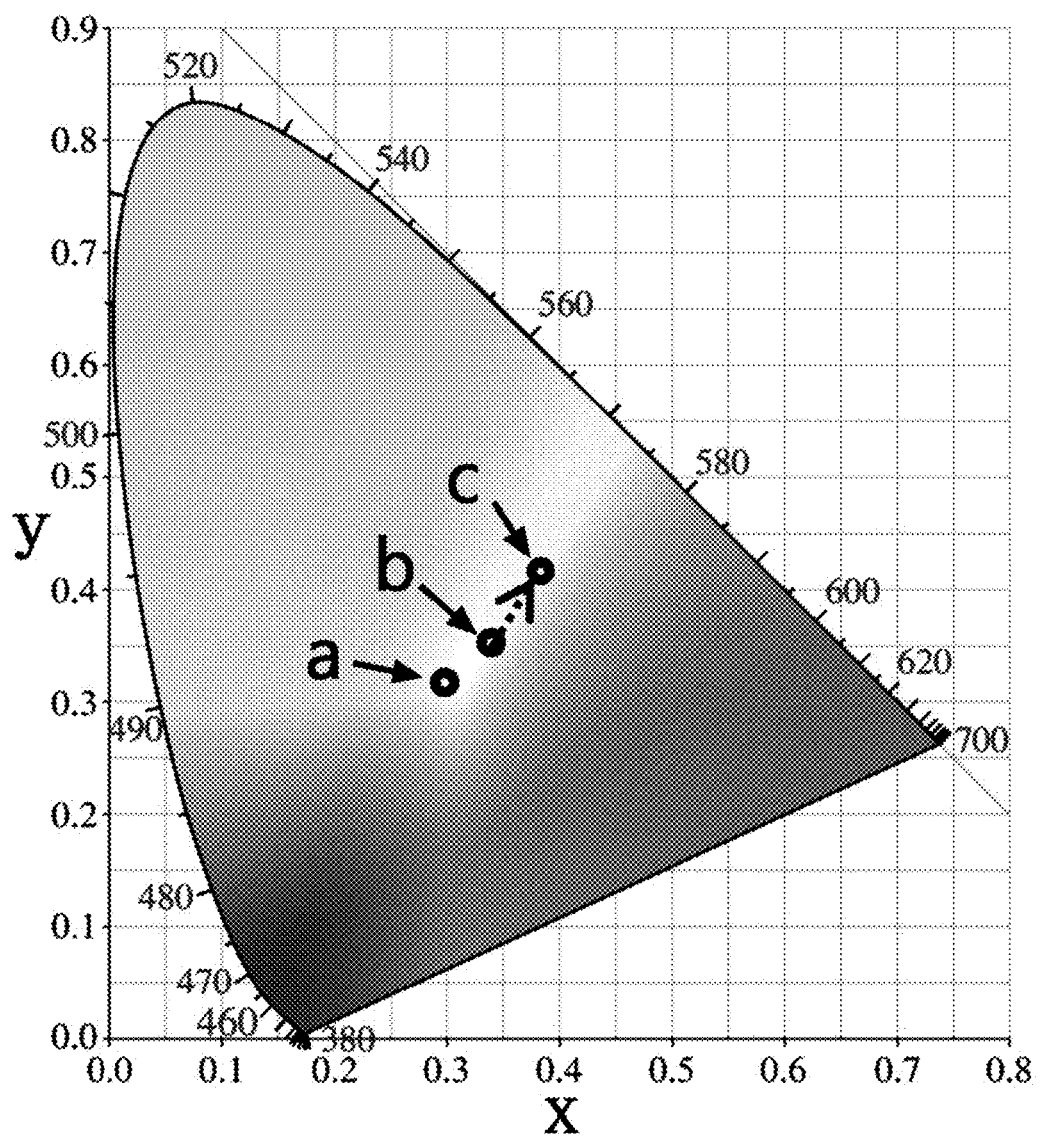
FIG. 7 exemplarily illustrates a color coordinate in an LCD including a light-guide plate and a light source of FIG. 6.

FIG. 7 exemplarily illustrates a color coordinate in an LCD including the light-guide plate 201 and the light source 205 of FIG. 6.

If a color coordinate of the lateral light source 205, for example, an LED is a position "a", it is natural that the position "a" moves to a position "b", which is a color coordinate of the portion 202 close to the light source 205, when the light-guide plate 201 is applied. However, when a difference between a position "c", which is a color coordinate of the portion 203 away from the light source 205, and the position "b" is large, color on a display changes, which is problematic.

Actually, though various color differences may occur depending on a kind of glass forming the light-guide plate, a wavelength band of a light source, etc., FIG. 7 exemplarily illustrates a case where a color coordinate changes from the position "b" to the position "c" when light propagates in a red direction from the portion 202 close to the light source 205 to the portion 203 away from the light source 205. That is, FIG. 7 exemplarily illustrates a case where light absorption occurs much in a relatively short wavelength region (about 550 nm or less) as the light propagates.

The present disclosure is designed to adjust color coordinates of the position "a" and the position "b" to the same value as much as possible. Therefore, operations s2 and s3 according to the present disclosure include determining a wavelength in which light absorption is relatively small when light propagates through the light-guide plate for experiment by using a color coordinate view, etc. like FIG. 7, and selecting a transition metal oxide which may selectively absorb this wavelength. In the case of an example shown in FIG. 7, since light absorption occurs much in a relatively short wavelength region (about 550 nm or less) and absorption of a red wavelength is small when light propagates, a component which absorbs a red wavelength, for example, CuO is selected as an element for adjusting a color difference. Also, to determine content of this transition metal oxide, samples including different content are manufactured, a change in a color difference in an x-direction and a color difference in a y-direction is observed, and content which achieves a color difference within an allowed range is selected.

Particularly, in a preferred embodiment, after integrating a backlight unit including the light-guide plate for experiment and the light source with a liquid crystal panel, and manufacturing an LCD like an actual LCD, the wavelength is determined by allowing light from the light source to propagate. By doing so, not only glass of the light-guide plate but also all factors causing a color difference inside a display device such as an LCD may be considered.

In a preferred embodiment, the basic glass composition includes 70 to 85 wt % of $SiO_2$, 5 to 20 wt % of $B_2O_3$, 0 to 5 wt % of $Al_2O_3$, 1 to 7 wt % of $R_2O$ (here, R is at least one of Li, Na, and K), 0 to 0.005 wt % of $Fe_2O_3$, but a different kind of borosilicate glass or soda-lime glass may be used as basic glass.

Figure 8:
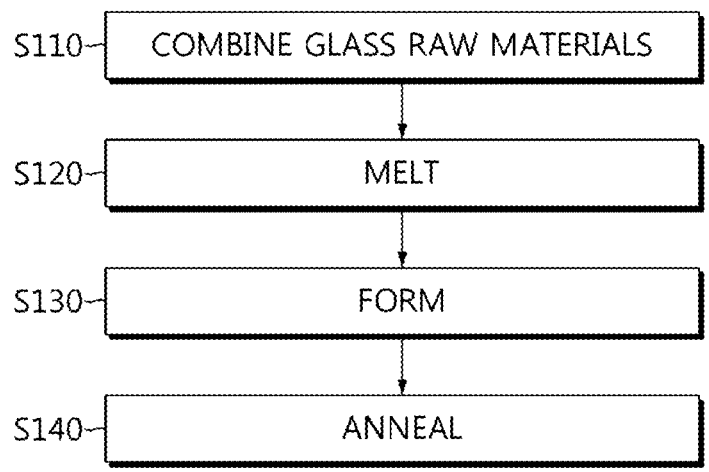
FIG. 8 is a flowchart for explaining operations of manufacturing glass.

After determining a wavelength which needs to be absorbed as described above, in operation s3, a light-guide plate may be manufactured by manufacturing a glass for a light-guide plate according to a flowchart shown in FIG. 8.

FIG. 8 is a flowchart for explaining operations of manufacturing glass.

Referring to FIG. 8, first, raw materials of respective components included in glass are combined such that objective composition is obtained (S110). In this case, in operation S110, basic glass composition raw components are combined, and a transition metal oxide selected in operation s2 is added. In this case, content of each raw material, a fining agent condition, etc. are the same as those described above in the embodiment of the light-guide plate. Glass raw materials may be obtained from known start materials including an alkali oxide such as Na, K, and Li.

Next, a glass raw material is molten by heating the above-combined glass raw materials to predetermined temperature, for example, 1500 to 1600° C. (S120), and after a fining process is performed, the molten glass is formed (S130).

In a melting process (S120), the glass raw material is heated in a melting furnace (not shown) and so molten glass is generated. Next, in the fining process, a bubble in the molten glass is removed in a fining tank (not shown) by using the above-described fining agent. In the fining process, temperature of molten glass in the fining tank is raised and so a bubble including $O_2$, $CO_2$, or $SO_2$ included in the molten glass grows by absorbing $O_2$ generated by a reduction reaction of the fining agent, floats on a surface of the molten glass, and is emitted (a defoaming process). Also, in the fining process, after defoaming, by lowering temperature of the molten glass, $O_2$ in a bubble remaining in the molten glass is absorbed in the molten glass by an oxidation reaction of a reactant obtained by reduction reaction of the fining agent, and so a bubble becomes extinct (an absorption process). The oxidation reaction and the reduction reaction by the fining agent are performed by controlling temperature of the molten glass.

After the fining process, an agitation process may be performed. In the agitation process, to maintain chemical and thermal uniformity of glass, the molten glass is allowed to pass through an agitation tank (not shown) vertically directed. While the molten glass is agitated by an agitator installed in the agitation tank, the molten glass moves to a bottom portion in a vertically lower direction and is guided to a subsequent process. Accordingly, non-uniformity of glass such as stria may be removed.

Next, a forming operation may be performed (S130). In this case, operation S130 is performed by a float method which uses a float bath.

When the glass is formed in operation S130, the formed glass is transferred to an annealing furnace in which the glass passes through an annealing operation (S140).

After that, the slowly cooled glass is cut into a desired size, a process such as polishing is further performed, and the glass 115 and the glass light-guide plates 100 and 100' including the same may be manufactured through the series of processes.

Figure 9:
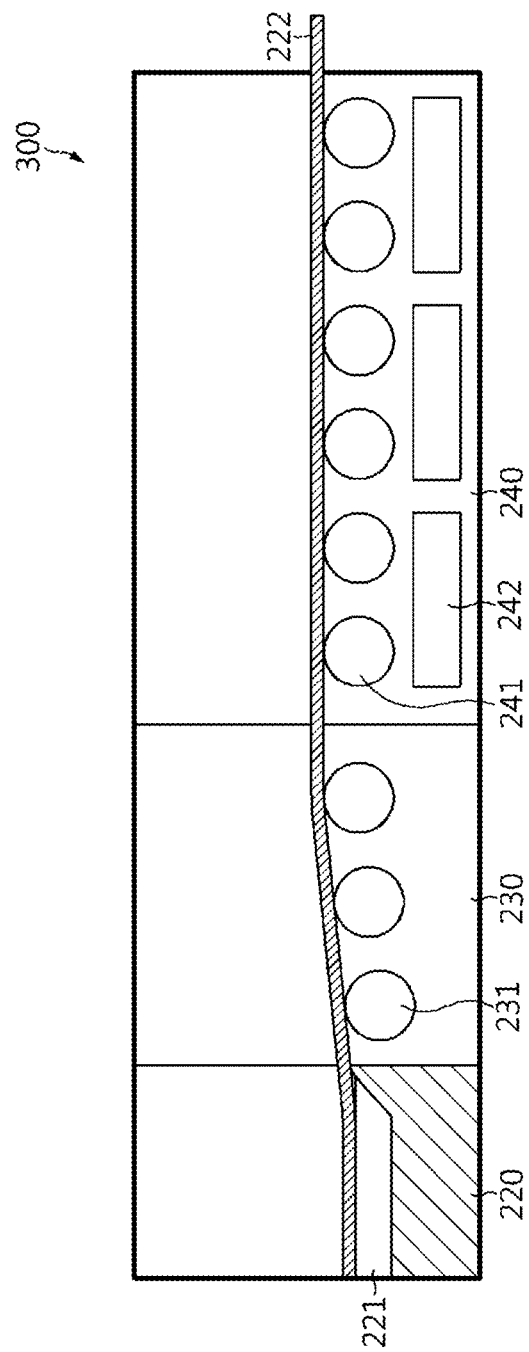
FIG. 9 is a schematic cross-sectional view of an apparatus for manufacturing a glass plate by using a float method.

FIG. 9 is a schematic cross-sectional view of an apparatus for manufacturing a glass plate by using a float method.

Referring to FIG. 9, a plate glass manufacturing apparatus 300 includes a float bath 220 configured to receive molten tin 221 therein and form molten glass in the form of a flat plate, an annealing furnace 240 configured to slowly cooling molten glass, and a dross box 230 configured to draw molten glass from the float bath 220 and transfer molten glass to the annealing furnace 240.

While moving from an upstream of the float bath 220 to a downstream of the float bath 220, molten glass is formed in the ribbon-shaped plate glass 222 on a surface of the molten tin 221, and is raised at a take-off point set at the downstream of the float bath 220 by a roller 231 installed in the dross box 230 such that the molten glass is away from the molten tin 221, passes through the dross box 230, and is transmitted to the annealing furnace 240 of the next process.

The annealing furnace 240 includes a plurality of sections. As illustrated, a plurality of rollers 241 are used for one section, and a heater 242 is installed in a space below the roller 241. The ribbon-shaped plate glass 222 is cooled down to a glass annealing point or less in the annealing furnace 240 while temperature of the ribbon-shaped plate glass 222 is controlled such that twisting and warping do not occur.

The plate glass manufacturing apparatus 300 may manufacture the large flat plate glass 222. The plate glass manufacturing apparatus 300 may manufacture the glass 115 by drawing the slowly-cooled plate glass 222, and further performing processes such as cutting the plate glass 222 into a desired size, polishing, etc., and may manufacture the glass light-guide plates 100 and 100' by including the plate glass 222. Since a plurality of excellent glass 115 may be obtained from the large flat plate glass 222, the glass light-guide plates 100 and 100' may be manufactured with high productivity.

Hereinafter, the present disclosure is described in more detail with reference to a comparative example and an embodiment. However, an embodiment according to the present disclosure may be modified in various forms and the scope of the present disclosure should not be construed as being limited to an embodiment described below. An embodiment of the present disclosure is provided to give those of ordinary skill in the art more complete understanding of the present disclosure.

Table 1 represents basic glass compositions

TABLE 1

| $SiO_2$ | $Al_2O_3$ | $B_2O_3$ | $Na_2O$ | $K_2O$ |
|---------|-----------|----------|---------|--------|
| 81 wt % | 2 wt % | 13 wt % | 3.5 wt % | 0.5 wt % |

With respect to the basic glass compositions, a sample in which CuO has been added as a transition metal oxide by 3, 5, and 7 ppm has been manufactured and a color difference has been experimented.

Figure 10:
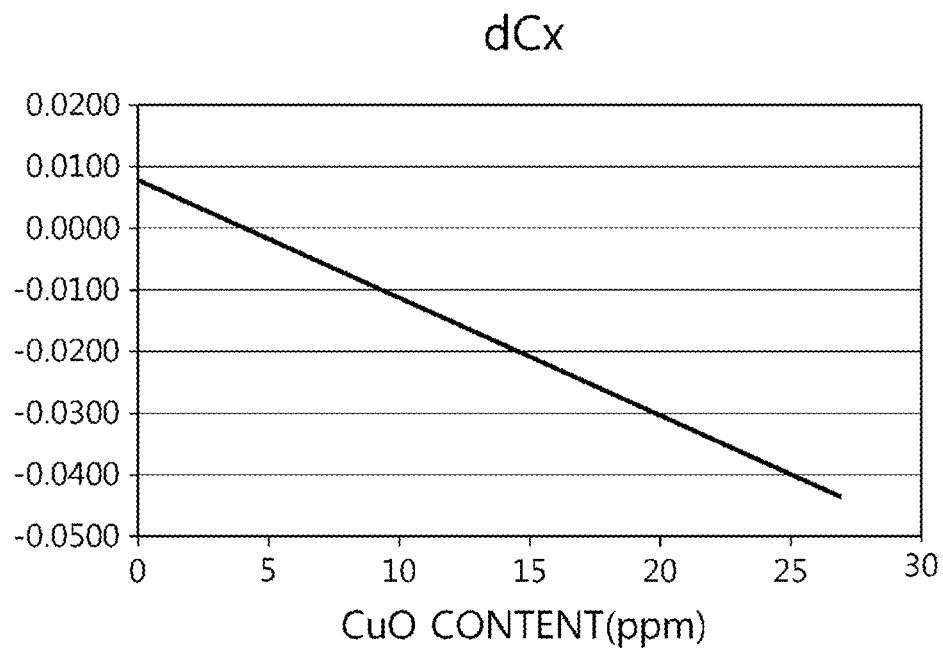
FIG. 10 is a graph illustrating an x-direction color difference (dCx) of a glass light-guide plate depending on CuO content.
Figure 11:
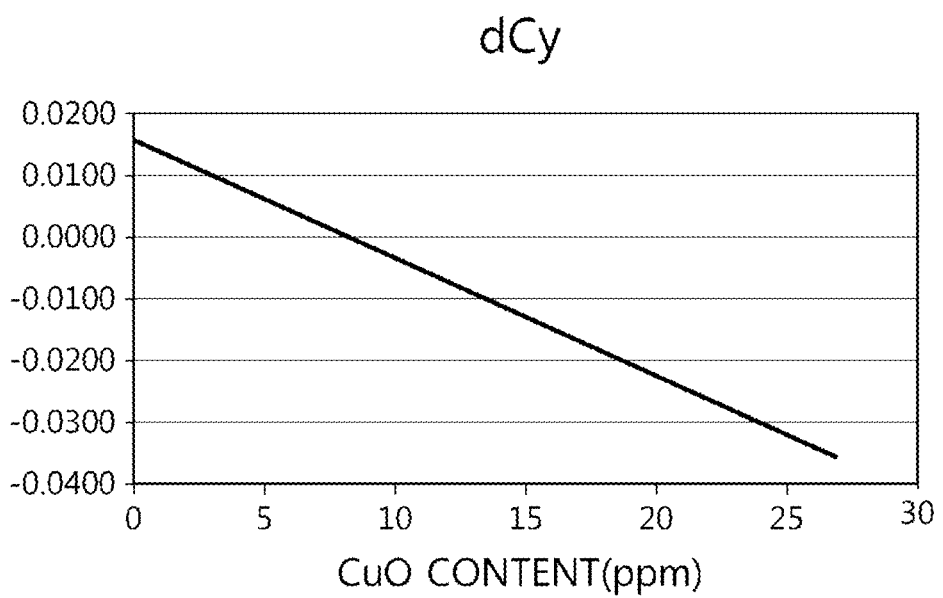
FIG. 11 is a graph illustrating a y-direction color difference (dCy) of a glass light-guide plate depending on CuO content.

FIG. 10 is a graph illustrating an x-direction color difference (dCx) of a glass light-guide plate depending on CuO content, and FIG. 11 is a graph illustrating a y-direction color difference (dCy) of a glass light-guide plate depending on CuO content.

As illustrated in FIGS. 10 and 11, a color difference increases in a negative direction when CuO content increases.

When CuO content is 0 (that is, in the case of the basic glass compositions), since both dCx and dCy have a positive value, CuO content which may change the relevant value in a negative direction should be selected to reduce a color difference. It is revealed that CuO content of about 5 to 15 ppm is effective in reducing a color difference under a given condition. Also, CuO content which allows both dCx and dCy to approach 0 may be selected, and it has been determined that such CuO content is about 8 ppm according to the present experiment.

A kind and content of the transition metal oxide is determined by the given basic glass compositions and a wavelength of the light source used for the experiment, and when these conditions change, a kind and content of a preferred transition metal oxide naturally change. For example, if dCx and dCy have a negative value under the basic glass compositions, content of a transition metal oxide which may change the relevant value in a positive direction should be selected to reduce a color difference.

Although the preferred embodiments of the present disclosure have been illustrated and described, the present disclosure is not limited thereto and it should be understood by those of ordinary skill in the art that various modifications may be made within the scope of claims without departing from concept of the disclosure.

What is claimed is:

1. A light-guide plate comprising glass containing 80 to 85 wt % of $SiO_2$, 5 to 20 wt % of $B_2O_3$, 0 to 5 wt % of $Al_2O_3$, 1 to 7 wt % of $R_2O$ (wherein, R is at least one of Li, Na, and K), 0 to 0.005 wt % of $Fe_2O_3$, and less than 0.002 wt % of a transition metal oxide for adjusting a color difference, wherein a redox ratio of the glass is 0.5 to 0.8.

2. The light-guide plate of claim 1, wherein the transition metal oxide is NiO, CoO, CuO, $Cr_2O_3$, $V_2O_5$, or MnO.

3. The light-guide plate of claim 1, wherein the transition metal oxide is CuO and is contained by 5 to 15 ppm.

4. The light-guide plate of claim 1, wherein while light is guided by 500 mm from a light-input portion (500 mm-light guide), a color difference is +0.015 to −0.015.

5. The light-guide plate of claim 1, wherein while light is guided by 500 mm from a light-input portion (500 mm-light guide), a color difference is +0.010 to −0.010.

6. The light-guide plate of claim 1, wherein the light-guide plate has absorption in visible light as a light-guiding distance increases by 500 mm or more.

7. A method of manufacturing a light-guide plate, the method comprising:
   manufacturing a light-guide plate for experiment from a basic glass composition;
   determining a wavelength of light at which absorption of the light is relatively small as the light propagates through the light-guide plate for experiment; and
   incorporating a transition metal oxide which selectively absorbs the wavelength into the basic glass composition, manufacturing glass, and manufacturing the light-guide plate comprising the glass,
   wherein the basic glass composition contains 80 to 85 wt % of $SiO_2$, 5 to 20 wt % of $B_2O_3$, 0 to 5 wt % of $Al_2O_3$, 1 to 7 wt % of $R_2O$ (wherein, R is at least one of Li, Na, and K), and 0 to 0.005 wt % of $Fe_2O_3$, and
   wherein a redox ratio of the glass is 0.5 to 0.8.

8. The method of claim 7, wherein the transition metal oxide is NiO, CoO, CuO, $Cr_2O_3$, $V_2O_5$, or MnO.

9. The method of claim 7, wherein the transition metal oxide is contained by less than 0.002 wt %.

10. The method of claim 7, wherein the transition metal oxide is CuO and is contained by 5 to 15 ppm.

11. The method of claim 7, comprising, after manufacturing a backlight unit comprising the light-guide plate for experiment and a light source and integrating the backlight unit with a liquid crystal panel, determining the wavelength by allowing light from the light source to propagate.

* * * * *